US006705305B2

(12) United States Patent
Suba et al.

(10) Patent No.: US 6,705,305 B2
(45) Date of Patent: Mar. 16, 2004

(54) MOUNTING FRAME FOR USE WITH A KIT FOR CONVERTING CONVENTIONAL PITCHING MACHINE INTO A VIDEO PITCHING MACHINE

(76) Inventors: Michael T. Suba, 20 Poe Ct., Fairfield, CT (US) 06432; Timothy O'Reilly, 25 Palmer St., Oxford, CT (US) 06478; Gregory J. Battersby, 25 Poplar Plain Rd., Westport, CT (US) 06880

( * ) Notice: Subject to any disclaimer, the term of this patent is extended or adjusted under 35 U.S.C. 154(b) by 0 days.

(21) Appl. No.: 10/183,229

(22) Filed: Jun. 27, 2002

(65) Prior Publication Data

US 2002/0157656 A1 Oct. 31, 2002

Related U.S. Application Data

(63) Continuation-in-part of application No. 09/776,659, filed on Feb. 5, 2001, now Pat. No. 6,546,924, which is a continuation of application No. 09/259,722, filed on Mar. 1, 1999, now Pat. No. 6,182,649.

(51) Int. Cl.[7] .................................................. F41B 4/00

(52) U.S. Cl. ............................................ 124/78; 124/80
(58) Field of Search ................................. 124/6, 78, 80

(56) References Cited

U.S. PATENT DOCUMENTS

| 5,195,744 A | * | 3/1993 | Kapp et al. |
| 5,344,137 A | * | 9/1994 | Komori |
| 5,359,986 A | * | 11/1994 | Magrath et al. |
| 6,305,366 B1 | * | 10/2001 | Rizzo et al. |

* cited by examiner

*Primary Examiner*—John A Ricci
(74) *Attorney, Agent, or Firm*—Grimes & Battersby, LLP

(57) ABSTRACT

The present invention comprises a unique mounting frame for use in conjunction with a conversion kit for a conventional, combination baseball/softball pitching machine of the wheel type. Both machines are separately mounted on individual base plates that are pivotably mounted to the front of the frame. The plates are interconnected so as to move in an integral manner pivoting relative to the front of the frame. Movement is controlled by a linear actuator which permits them to be raised and lowered as a single unit by a single raise and lower mechanism.

2 Claims, 2 Drawing Sheets

MOUNTING FRAME FOR USE WITH A KIT FOR CONVERTING CONVENTIONAL PITCHING MACHINE INTO A VIDEO PITCHING MACHINE

RELATED APPLICATIONS

This is a continuation-in-part application of U.S. patent application Ser. No. 09/776,659 filed on Feb. 5, 2001 for "Ball Throwing Machine & Method for Profiling Pitches," now U.S. Pat. No. 6,546,924, which, in turn is a continuation of U.S. patent application Ser. No. 09/259,722 filed on Mar. 1, 1999 for "Ball-Throwing Machine" and which subsequently issued on Feb. 6, 2001 as U.S. Letters Pat. No. 6,182,649.

FIELD OF THE INVENTION

The present invention relates generally to a mounting frame for use with a kit for converting a conventional combination baseball and softball pitching machine into a video pitching machine.

DESCRIPTION OF THE PRIOR ART

Pitching machines and ball-throwing machines are well-known in the art and generally fall into four categories: (1) machines that employ a spring actuated arm mechanism to propel the ball; (2) machines that employ at least one rotating wheel or a pair of rotating, coasting wheels to propel the ball; (3) machines that rely on pneumatic pressure to propel the ball; and (4) machines that employ converging and diverging rotatable discs to propel the ball.

Wheeled pitching machines have been the industry standard for many years. Companies such at ATEC of Sparks, Nev.; The Jugs Company of Tulatin, Oreg.; and Bata Baseball Machines of San Marcos, Calif. have long marketed two wheeled pitching machines used in both a training environment as well as for commercial batting cages. In a commercial environment, these machines are typically installed in individual batting cages, frequently with ball retrieval systems. The machines are mounted at one end of the cage with the hitter at the opposite end. The only warning that a hitter receives that a pitch is about to be delivered is a light that may (or may not) illuminate above the machine indicating that a ball is about to be delivered. In some instances, operators use clear tubing as a ball feed to permit batters to actually see the ball as it rolls into the machine so that they can know that the next pitch is about to be delivered.

On the training side, the use of such machines is frequently a problem for serious players since the success of most players at higher levels (and faster pitching speeds) is an ability to properly time a pitch. Obviously, timing a ball as it rolls down a tube is vastly different from timing the windup and release of an actual pitcher in game-like conditions. This timing difference is one reason why some coaches discourage their hitters from working in batting cages during the season.

The incorporation of a video display in combination with such conventional wheeled pitching machines has been known for quite some time. See, for example, U.S. Pat. No. 5,195,744 which issued on Mar. 23, 1993 to Neil S. Kapp et al. for Baseball Batting Practice Apparatus with Control Means where a ball is introduced into a conventional pitching machine by a gravity drop which is timed in synchronization with a video display. The synchronization means of such device relies upon an audio signal generated by the video, without any regard to the status of the ball in the queued position. Furthermore, the ball queuing system of this device relies on gravity and is imprecise and subject to failure.

ProBatter Sports, LLC of Milford, Conn. markets its "Professional" line of video pitching simulators which employ substantially more complex video control systems in conjunction with a multi-pitch pitching machine. The ProBatter systems are described in greater detail in U.S. Pat. No. 6,182,649 which issued on Feb. 6, 2001 in the name of Gregory J. Battersby et al. for a Ball-Throwing Machine; U.S. Pat. No. 6,186,133 which issued on Feb. 13, 2001 in the name of Gregory J. Battersby et al. for System and Method for Establishing Pitch Parameters in a Ball-Throwing Machine; and U.S. Pat. No. 6,186,134 which issued on Feb. 13, 2001 in the name of Gregory J. Battersby et al. for Pitching System with Video Display Means, the disclosures of which are all incorporated herein by reference thereto.

Chin Music, LLC of Seattle, Wash. has also developed a computerized pitching machine which is marketed by Fastball Development Inc. for a product called "Abner." This technology is described more fully in U.S. Pat. No. 6,082,350 which issued on Jul. 4, 2000 for Accurate, Multi-Axis, Computer Controlled Object Projection Machine.

Master Pitching Machine recently began marketing a product called the LED Pitcher which is an LED display system of a simulated pitcher which they mount in advance of their spring actuated Iron Mike machine. The machine utilizes two cams on the machine, the first to turn on the LED Pitcher and the second to release the ball. The LED screen is mounted adjacent to the release point of the Iron Mike machine so that the ball comes off the side of the screen. As such, portions of the arm of the LED pitcher are lost as the arm gets closer to the release point. In addition, the LED image is vastly different from a video image in that motion is in stepped phases as opposed to the fluid motion of a video image. Finally, as a result of the LED makeup, it is impossible to change pitcher images as is the case with a video image where interchangeable video images can be used interchangeably.

None of these systems specifically address the creation of a mounting frame for use with a conversion kit for existing combination baseball and softball pitching machines to permit them to include a video component which permit them to be used in combination with a common control cabinet and projection system and common raise/lower unit.

SUMMARY OF THE INVENTION

Against the foregoing background, it is a primary object of the present invention to provide a mounting frame for use with a kit for converting a conventional wheeled pitching machine to a video pitching machine.

It is another object of the present invention to provide such a frame to be used in conjunction with a conventional combination baseball and softball pitching machine.

It is yet another object of the present invention to provide such a frame that can be used in conjunction with a combination baseball and softball machine to permit them to share a common control box and projection system and common raise/lower mechanism.

To the accomplishments of the foregoing objects and advantages, the present invention, in brief summary, comprises a unique mounting frame for use in conjunction with a conversion kit for a combination baseball/softball pitching machine, in which both machines are mounted on base plates that are interconnected so as to move in an integral manner and are controlled by a linear actuator which permits them to be raised and lowered as a single unit by a single raise and lower mechanism.

BRIEF DESCRIPTION OF THE DRAWINGS

The foregoing and still other objects and advantages of the present invention will be more apparent from the detailed explanation of the preferred embodiments of the invention in connection with the accompanying drawings, wherein.

DETAILED DESCRIPTION OF THE PREFERRED EMBODIMENTS

The present invention comprises a mounting frame for use with conventional, wheeled baseball and softball pitching machines, preferably those which include a conversion kit for use in converting such conventional machines to video machines. The conventional wheeled pitching machines are preferably two-wheeled machines such as, for example, the Casey Pro system marketed by ATEC. It will be appreciated that the conversion kit of the present invention can be used in conjunction with virtually any wheeled pitching machine, preferably of the type marketed by ATEC, Jugs, Amusement Products and others. Specifically, it can be used with either a one or two wheeled machine and with either two baseball pitching machines, two softball pitching machines or in conjunction with a combination baseball/softball pitching machine.

Figure 1:
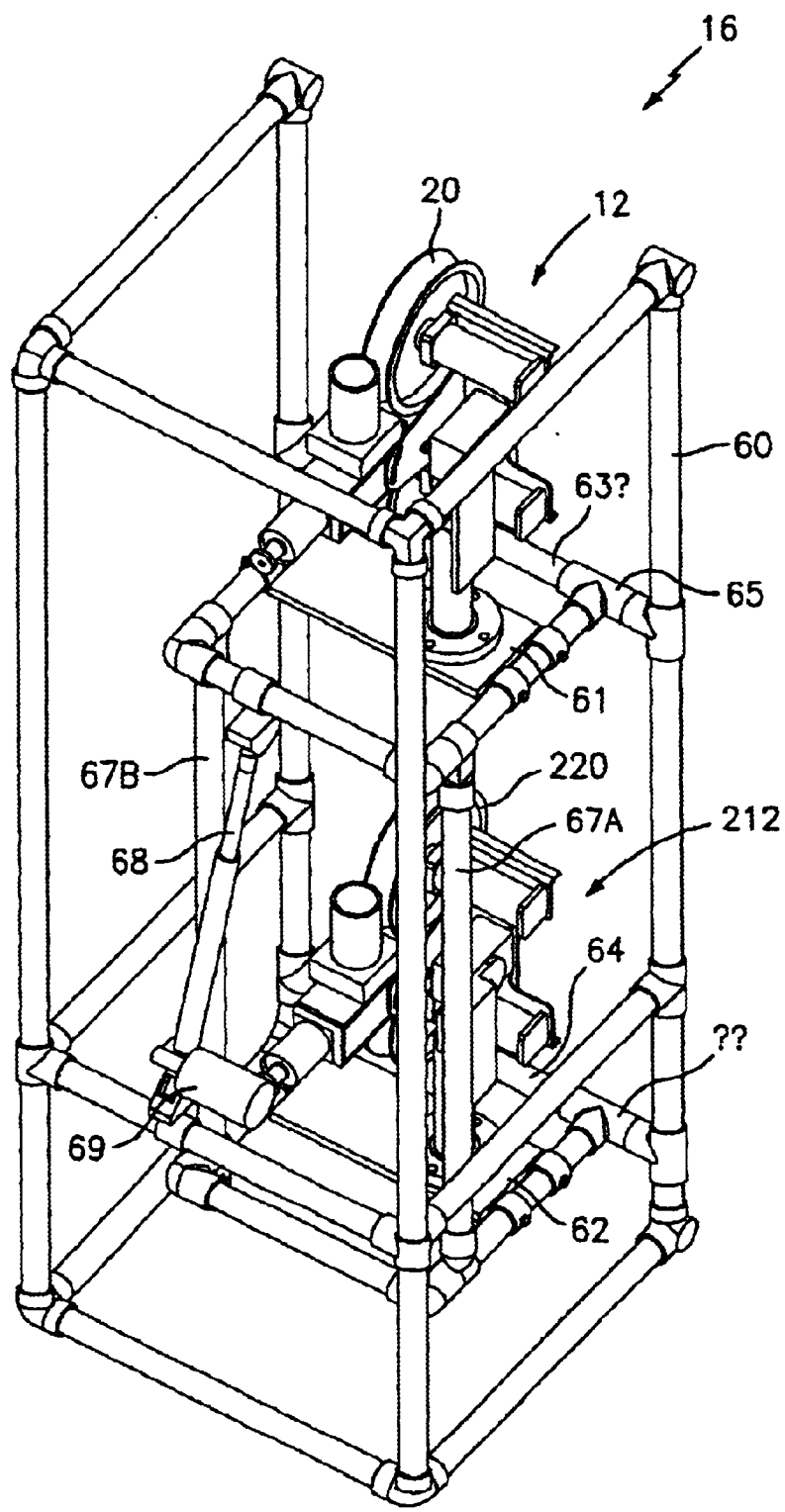
FIG. 1 is a perspective view of the combination baseball/softball pitching machine of the present invention with the conversion kit installed.
Figure 3:
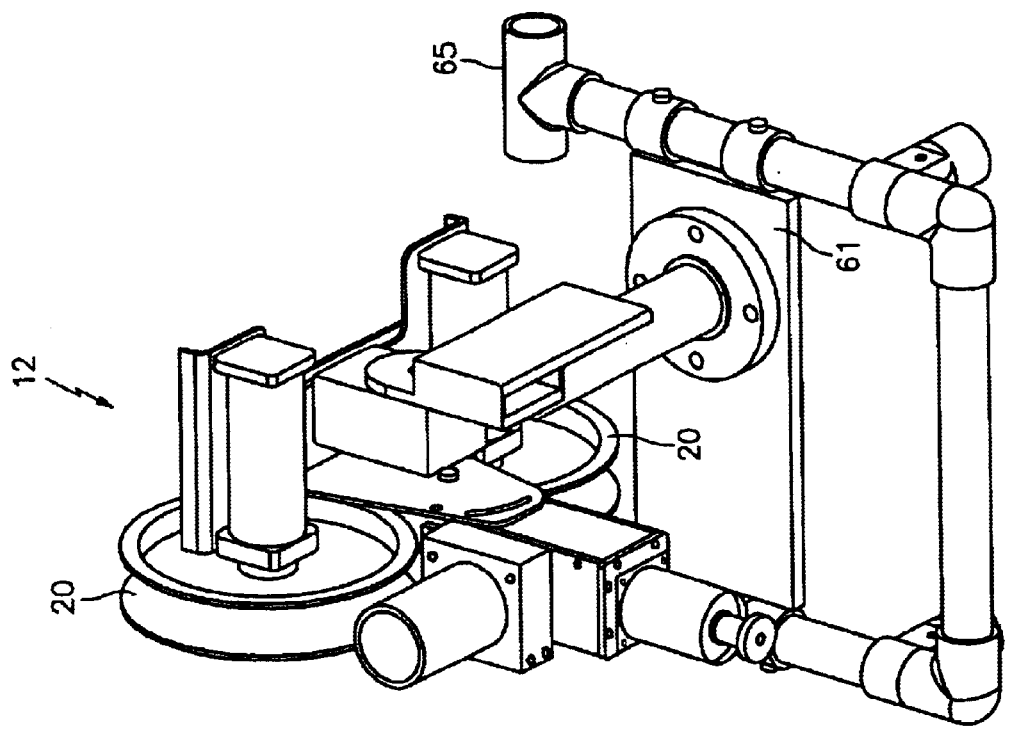
FIG. 3 is an exploded perspective view of the baseball portion of the combination baseball/softball pitching machine of FIG. 1 with the conversion kit installed.
Figure 2:
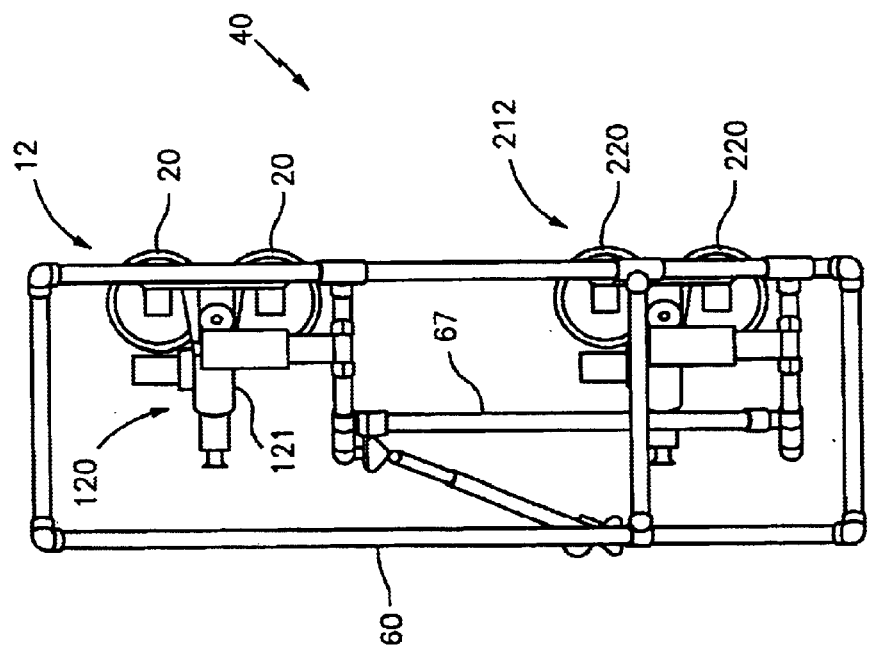
FIG. 2 is a side view of a combination baseball/softball pitching machine of FIG. 1 with the conversion kit installed.

FIGS. 1–3 illustrate a combined baseball/softball pitching machine 16 which includes an individual baseball pitching machine 12 mounted on a frame 60 above an individual softball pitching machine 212. Both pitching machines 12, 212 are two-wheeled pitching machines, preferably the Casey Pro units marketed by ATEC.

The frame 60 used to mount the combination baseball/softball machine 16 is particularly unique in that both the baseball machine 12 and softball machine 212 are pivotally mounted on a unitary frame 60. This is accomplished by securing each of the baseball and softball machines, 12 and 212, respectively, to top and bottom mounting plates 61 and 62, respectively, which are then pivotally mounted to front support bars 63 and 64 on the frame 60 by a pair of pivot collars 65 and 66 for each mounting plate 61, 62. Pivot collars 65 and 66 are adapted to envelop the front support bars 63, 64 which permit the plates 61 and 62 to pivot relative thereto.

The two mounting plates 61 and 62, respectively, are interconnected to each other by a pair of rear connecting bars 67A and 67B such that any movement of either mounting plate 61, 62 results in a corresponding movement of the other plate.

It should be noted that in frame 60, the baseball pitching machine 12 is mounted above the softball machine 212 so as to better simulate the actual release point of baseball and softball pitchers. Baseball pitchers typically throw their pitches overhand while softball pitchers typically throw underhand. The typical release point for a baseball pitcher is at least six feet from the ground while the typical release point for a softball pitcher is typically less than 2 feet off the ground. By mounting the baseball and softball machines in this manner, it more closely simulates the actual release point of pitchers which is critical due to the video component of the system of the present invention.

The actual angle of each of the baseball and softball machines, 12 and 212, respectively, is controlled by a control bar 68 which is connected at one end to the upper baseball mounting plate and at its lower end to a linear actuator 69 which is connected to a separate raise/lower control box (not shown) which is part of the traditional pitching machine installation. In this manner, a user can readily change the angle of either machine as a function of pitch location or pitch type. By connecting these two pitching machines 12, 212, it is possible to use a single control box to change the angle of either machine thus eliminating the need for separate controls.

Having thus described the invention with particular reference to the preferred forms thereof, it will be obvious that various changes and modifications can be made therein without departing from the spirit and scope of the present invention as defined by the appended claims.

Wherefore, We claim:

1. A mounting frame for a combination baseball/softball pitching machine, said frame having a front portion and a rear portion and including:

an upper plate on which a baseball pitching machine is pivotally mounted to the front portion of said frame;

a lower plate on which a softball pitching machine is pivotally mounted to the front portion of said frame;

means for connecting said upper plate to said lower plate so that both pitching machines move in an integral manner; and means for causing said upper and lower plate to both pitching machines to pivot in an integral manner in response to a signal received from a control box.

2. The mounting frame of claim 1, wherein said means for causing comprises a liner actuator adapted to raise and lower the rear portion of both plates in response to a signal received from a control box.

* * * * *